United States Patent
Deb et al.

(10) Patent No.: US 6,259,096 B1
(45) Date of Patent: *Jul. 10, 2001

(54) GUANINE CYTOSINE (GC)-RICH DNA/PNA MICROBOLOMETER

(75) Inventors: Krishna K. Deb, Beltsville, MD (US); Anthony G. Gutierrez, Stewartstown, PA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/160,204

(22) Filed: Sep. 18, 1998

(51) Int. Cl.$^7$ ................................................ H01L 31/0256

(52) U.S. Cl. ................................... 250/338.1; 250/338.3; 250/306

(58) Field of Search .......................... 250/338.1, 338.3, 250/306

(56) References Cited

U.S. PATENT DOCUMENTS 5,389,475 * 2/1995 Yanagisawa et al. ................. 250/306
5,629,665 * 5/1997 Kaufmann et al. ................ 250/338.1

FOREIGN PATENT DOCUMENTS

91/16607 * 10/1991 (WO).

* cited by examiner

Primary Examiner—Constantine Hannaher
Assistant Examiner—Otilia Gabor
(74) Attorney, Agent, or Firm—Paul S. Clohan, Jr.

(57) ABSTRACT

This invention is related to the field of uncooled infrared (IR) detector technology, and it particularly demonstrates the use of thin film structures on oxidized silicon consisting of Guanine Cytosine (GC)—rich double-stranded DNAs and peptide nucleic acid (PNAs) helices and the current CMOS electronic circuits for optimizing the IR detector performance of uncooled microbolometer technology. PNAs are a new class of DNA mimics in which the regular nucleotide bases of adenine, thymine, cytosine and guanine are connected via a peptide-like backbone (Ref. 1). PNA molecules retain the same Watson-Crick base pairing as regular oligonucleotides, with the added benefits of resistance to enzyme digestion. It is anticipated that DNA /or PNA molecules rich in GC base pairs would exhibit relaively high temperature coefficient of resistance near their melting temperature as compared with the Watson-Crick B-form of DNAs because of the three hydrogen bonds associated with the GC base pairs in the double-stranded helical structure, allowing excellent IR imaging capability in night vision devices. The predicted performance of such DNA microbolometer on oxidized silicon will certainly exceed the short range limit of the present VOx microbolometer technology currently employed in military service and it will even compete with the expensive cooled staring systems in most applications.

4 Claims, 3 Drawing Sheets

GUANINE CYTOSINE (GC)-RICH DNA/PNA MICROBOLOMETER

RIGHTS OF THE GOVERNMENT

The invention described herein may be manufactured, used, and licensed by or for the Government without the payment of any royalties to anyone.

FIELD OF THE INVENTION

This invention is related to the field of uncooled infrared (IR) detector technology, and it particularly demonstrates the use of thin film structures on oxidized silicon consisting of Guanine Cytosine (GC)—rich double-stranded DNAs and peptide nucleic acid (PNAs) helices and the current CMOS electronic circuits for optimizing the IR detector performance of uncooled microbolometer technology. PNA are a new class of DNA mimics in which the regular nucleotide of adenine, thymine, cytosine and guanine are connected via a peptide-like backbone (Ref 1). PNA molecules retain the same Watson-Crick base pairing as regular oligonucleotides, with the added benefits of resistance to enzyme digestion, therefore extending its shelf life indefinitely. It is anticipated that DNA /or PNA molecules rich in GC base pairs would exhibit relatively high temperature coefficient of resistance near their melting temperature as compared with naturally occuring Watson-Crick B-form of DNAs because of the three hydrogen bonds associated with the GC base pairs in the double-stranded helical structure, allowing excellent IR imaging capability in night vision devices. The predicted performance of such DNA microbolometer on oxidized silicon will certainly exceed the short range limit of the present VOx microbolometer technology currently employed in military service and it will even compete with the expensive cooled staring systems in most applications.

BACKGROUND INFORMATION

Applicant's invention pertains to a Thermal Infrared Detector of the thin film resistance bolometer type, wherein IR radiation incident on the bolometer is absorbed, resulting in a temperature rise of the detector material and therefore a change in the resistance of the bolometer detector material, which can then be transmitted or recorded by currently available CMOS circuits. Thin film bolometer infrared detectors using proteins of high dipole moment are described by the present author in recent US Patent No ARL-98-46 and others using either $VO_x$ or semiconductors are described in U.S. Pat. Nos. 4,574,263; 4,116,063 and 3,069,644 respectively. However, the proposed biological microbolometer made of GC-rich double-helical DNAs or PNAs is expected to provide much higher IR detecting capability as compared with the conventional microbolometer made of $VO_x$ materials.

BRIEF SUMMARY OF THE INVENTION

This invention improves the sensitivity and resolution of the present uncooled microbolometer technology by sufficiently increasing TCR properties of the detecting elements by simply replacing $VO_x$ or semiconductors with thin films of GC-rich DNAs and PNAs. The temperature coefficient of resistance (TCR) properties defined as TCR=1/R (dR/dT) where R is the material resistance at the operating temperature T. Routinely obtained TCR values for $VO_x$ are close to −2.5%/deg C and TCR values of proteins are of the order of +5% to 8.0%/° C. The B-form of DNAs are expected to exhibit a sharper break in conductivity when it denatures, since it converts from a double-stranded helix to a random coil. DNAs and PNAs rich in GC base pairs seem to provide even better TCR values when they denature because of the three hydrogen bonds associated with the GC base pairs (see FIG. 1). As a result GC rich DNAs and PNAs are supposed to exhibit higher sensitivity in IR detection as compared with the other materials proposed in the patent applications cited in this text.

DESCRIPTION OF THE INVENTION

A publication entitled A PROTEIN MICROBOLOMETER FOR FOCAL PLANE ARRAYS to be published in NATURE by K. K. Deb, is incorporated into this application disclosure.

The DNA or PNA rich in GC base pairs seems to exhibit relatively better IR detectability than other biological or $VO_x$ materials because of the three hydrogen bonds associated with the G/C base pairs in a double-helical structure. The infrared detector is comprised essentially of a monolayer of a GC rich DNA onto a microcircuit grade oxidized silicon substrate. Because of the monolayer of DNAs, the thermal conductance and capacitance of each pixel is expected to be very small that will further enhance the sensitivity of the IR detectors. The GC-rich DNA are available from many bacterial sources (see Ref 2). DNA molecules absorb IR scene radiation strongly because of the complexity of the structure and they normally provide good thermal match to the oxidized silicon substrate. Each detector pixel is connected to an electronic circuit for readout purposes, and in the case of a multi-dimensional monolithic array each infrared detector would be part of a more complex electronic readout system.

DESCRIPTION OF THE PREFERRED EMBODIMENT

Figure 1A:
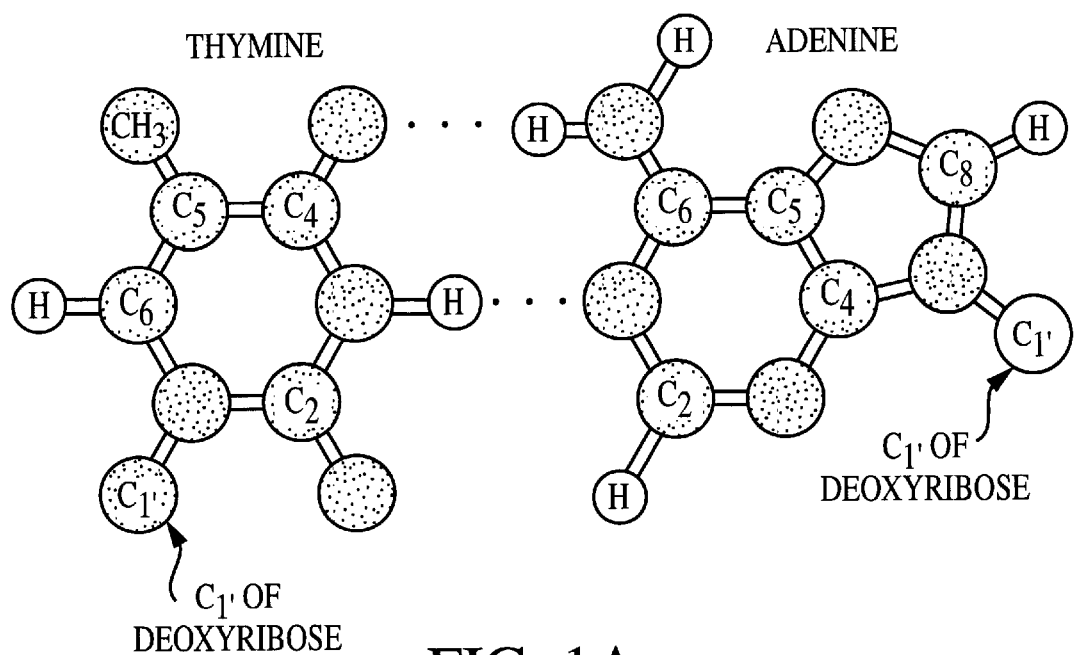
FIG. 1 shows the three hydrogen bonds associated with GC base pairs as compared with two hydrogen bonds associated with AT base pairs in a double-helical DNA/PNA structure.
Figure 1B:
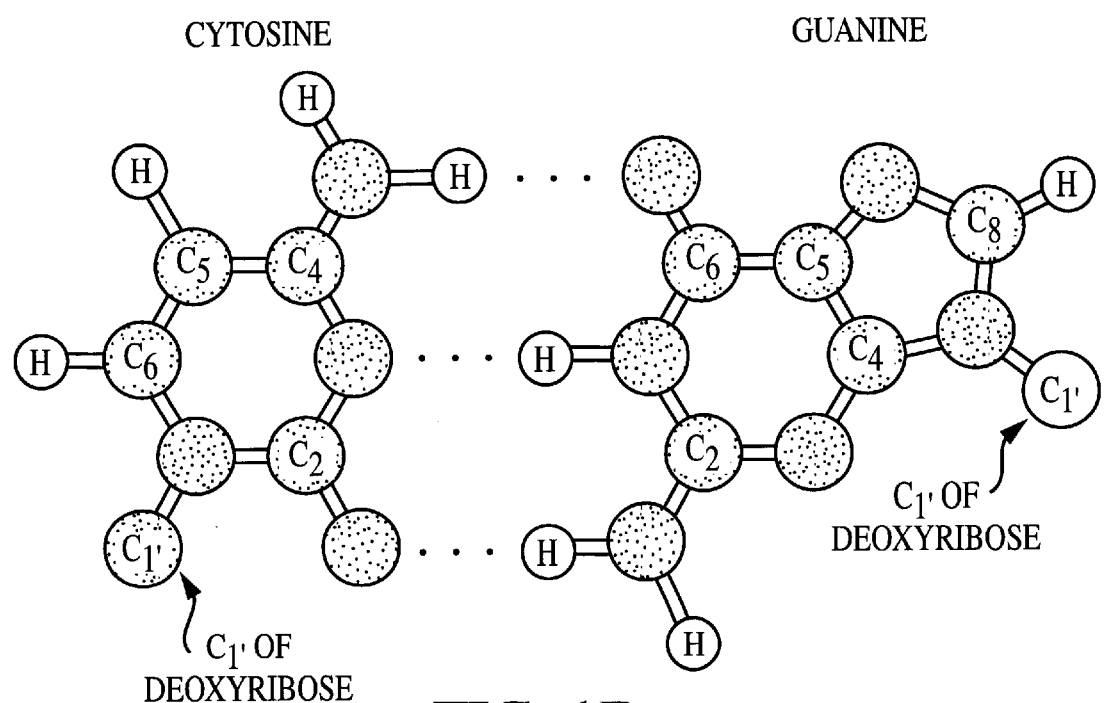
Figure 2:
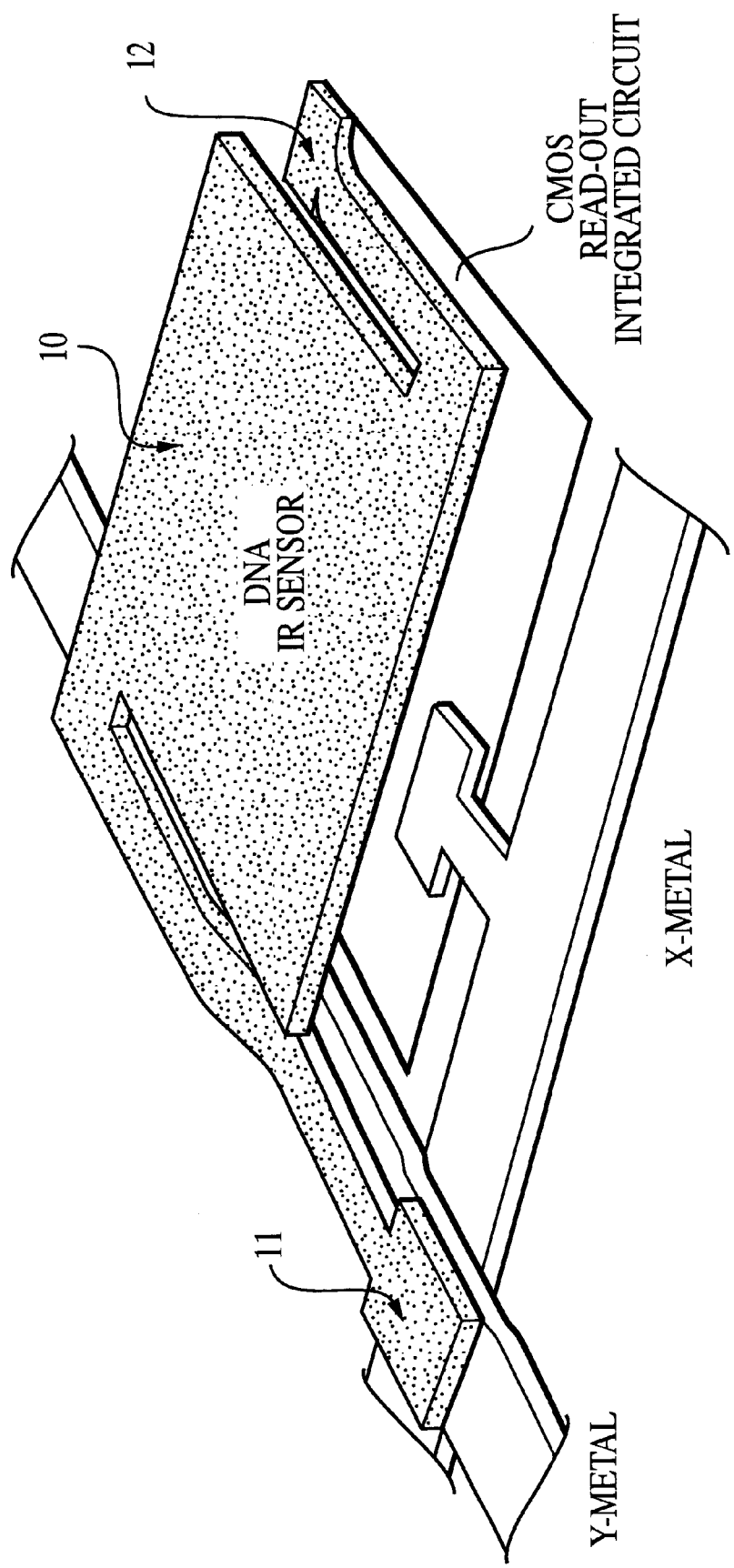
FIG. 2 is a representation of a single detector element made out of a GC rich DNA/PNA

The substrate is a monocrystalline silicon wafer having a 1,0,0 surface orientation. Referring to FIG. 2, it is seen that the DNA/PNA sensor 10 has electrodes 11 and 12. The DNA/PNA detector 10 is comprised of a two-dimensional array where a part of its readout electronics is directly underneath the detector pixel. Because of the low resistance of DNA/PNA (~1 ohm) the readout mechanism should be very fast when compared with inorganic bolometric arrays. Vanadium oxide or semiconductors have much higher resistance of the order of 1–100 kΩ. The conventional pixel size of DNA/PNA bolometers is expected to be of the order of 50 microns square with a pitch of 50 microns and the array assembly is required to be packaged in an evacuated vessel. Each pixel is fabricated by depositing single or multiple layers of DNA/PNA material and etching the underlying material to produce a free standing bridge structure (as shown in H. Jerominek, et al; SPIE Vol. 2746, 60–71).

Figures 3, 4:
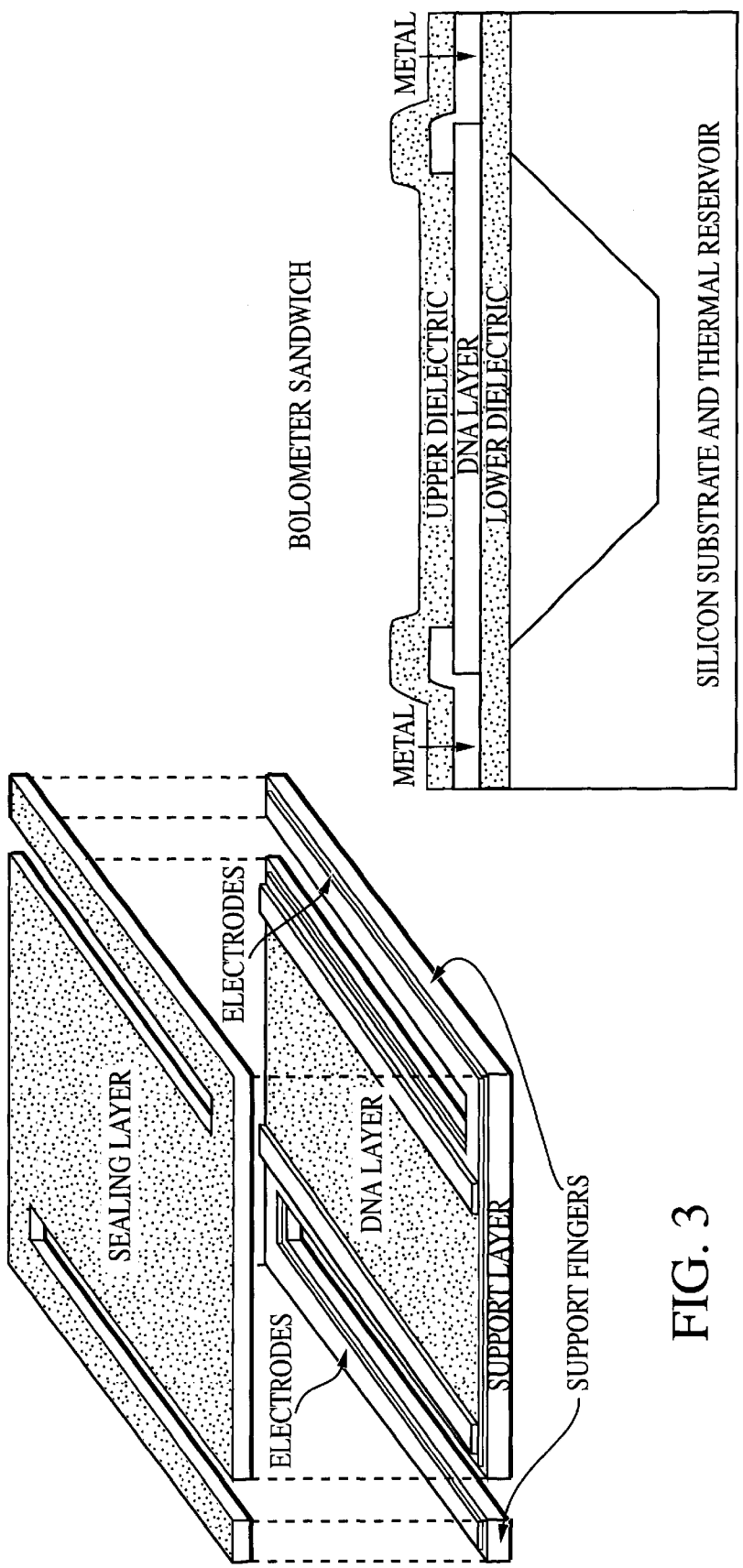
FIG. 3 shows a sealing layer over the DNA /or PNA
FIG. 4 shows a complete bolometer construction.

This type of device structure is highly preferable in increasing detector performance because of the expected low thermal conductance of pixels. DNA/PNA materials are deposited on the top of the oxidized silicons by spin coating techniques as described in Bolton and J. R. Scherer, J. Phys Chem 1989, 93 7635–7640). In order to deposit a thin layer of DNA/PNA material onto SiO2/Si structure, DNA/PNA preparations are adsorbed onto the oxidized silicon wafers. The leg metal is then deposited to connect DNA/PNA pixels to the CMOS electronics. Oxidized silicon is also required to passivate the DNA/PNA material (shown in FIG. 3 as a sealing layer). The X and Y metals as shown in FIG. 2 are components of the CMOS circuits.

DNA may be the most abundant complex macromolecular compound on the planet. Its physiochemical properties are well studied and are routinely exploited in biological detection schemes such as DNA hybridization and PCR. This invention involves the use of this well characterized molecule for imaging purposes, as an example of the nonbiological utility of this compound. Linking DNA denaturation and its subsequent change in conductivity with absorbency of infra-red radiation quantitatively results in an inexpensive and very sensitive detection system. DNA's use as a commercial compound is currently practical. The lability of natural DNA (due to the ubiquitous nature of Dnases in the environment) has been overcome with the advent of PNA, a synthetic DNA-like compound with no correlating degradative enzymes in nature.

What is claimed is:

1. A hybridized biological microbolometer for thermal infrared detection comprising a heat sensitive guanine cytosine-rich double stranded DNA layer with electrical contacts, on a silicon dioxide substrate insulator, said substrate on a silicon base.

2. A microbolometer as in claim 1, wherein said heat sensitive DNA layer comprises a PNA compound.

3. A microbolometer as in claim 1, wherein said layer comprises associated electronic circuits.

4. A microbolometer as in claim 3, wherein said associated electronic circuits comprise an array means for readout of infrared radiation scenes.

* * * * *